United States Patent [19]
Sarumaru

[11] 3,903,227
[45] Sept. 2, 1975

[54] METHOD FOR VULCANIZATION-PRESSING OF VEHICULAR TIRE TREADS

[75] Inventor: Kazumasa Sarumaru, Ashiya, Japan

[73] Assignee: Kobe Machinery Co., Ltd., Japan

[22] Filed: Apr. 13, 1973

[21] Appl. No.: 350,926

[30] Foreign Application Priority Data
Apr. 19, 1972 Japan................................ 47-39371

[52] U.S. Cl. .................... 264/89; 264/36; 264/94; 264/326; 425/24; 425/42; 425/44
[51] Int. Cl.............................................. B29h 5/04
[58] Field of Search ......... 264/94, 36, 40, 315, 326, 264/89; 425/24, 44, 42, 40, 41

[56] References Cited
UNITED STATES PATENTS

| | | | |
|---|---|---|---|
| 3,329,748 | 7/1967 | Hugger | 264/326 X |
| 3,729,358 | 4/1973 | Barefoot | 264/315 X |
| 3,770,858 | 11/1973 | Ireland et al. | 264/36 |
| 3,793,420 | 2/1974 | Fredricks et al. | 264/89 |

Primary Examiner—Jan H. Silbaugh
Attorney, Agent, or Firm—Armstrong, Nikaido & Wegner

[57] ABSTRACT

A method for vulcanization-pressing of vehicular tires in which a tire casing with an unvulcanized tread is placed in a tire-curing matrix which forms a hermetically sealed space within the tire casing. Pressurized air is injected into the casing which is then, heated by a heater which is installed in the above sealed space.

2 Claims, 4 Drawing Figures

METHOD FOR VULCANIZATION-PRESSING OF VEHICULAR TIRE TREADS

BACKGROUND OF INVENTION

1. Field of the Invention

This invention relates to a method of joining tire treads with tire casings through a vulcanization process in manufacturing new tires and recapping used tires of various kinds for vehicular use.

2. Description of the Prior Art

According to the prior art method of producing new vehicular tires, generally a tire to be vulcanized is initially inserted into a pair of split tire receiving matrix segments and a bladder, housed in a shrunken shape within said matrix, is inflated by a pre-heated gas or liquid fed therein under pressure, thereby said bladder presses against the inner side of the tire casing due to its expansion pressure and applies heat thereto. This inside vulcanization method is being extensively utilized in the industry as the most ordinary curing process.

For recapping vehicular tires, while the same method as above described for producing new tires can be applied, the use of so-called "half-sized" split tire receiving matrix segments permits the receipt of only the recapped tread and its adjacent side walls, since the tread is the only part to be recapped unless the tire's side walls are found damaged.

In this case, an expansion bag, formed of an elastic material in a doughnut shape with a hollow center, is inserted in advance inside a tire casing, and is then inflated with a heated gaseous body or liquid to press the tire casing at its inner side and to provide the appropriate heat for vulcanization.

However, as the size of tire becomes bigger, the expansion pressure applied to a tire's casing has to be greater, with the result that the pressure bag tends to inflate toward the hollow center thereof. Thus a back-up ring has to be inserted therein.

As mentioned above, the prior method requires either a bladder or expansion bag which takes time to insert in and dismantle from the tire curing matrix. Another disadvantage lies in the indirect pressure and heat produced by the bladder or expansion bag, which results in low heating efficiency. Furthermore, it is difficult to maintain the required fluid temperature in the bladder or bag during the curing process because of natural gradual drop in the fluid's temperature.

SUMMARY OF THE INVENTION

One object of this invention is to overcome these disadvantages, and to this end there is provided a method for direct interior vulcanization by inserting into a split tire receiving matrix segments of a tire comprising a tire casing and a tread provisionally adhering to the outer periphery of the casing. By means of pressurized air and heat generated within a hermetically sealed space formed in the closed matrix including the inner wall of the tire casing the casing and tread are vulcanized.

Another object is to provide an apparatus for carrying out this method, in which the interior vulcanization is performed by agitating and heating a pressurized air with a heat source located within a sealed space included with the inside wall of the tire casing, said sealed space being formed by inserting into the matrix segments a tire comprising a tire casing and a tread provisionally adhering to the outside wall of the casing and then closing said segments.

BRIEF DESCRIPTION OF THE DRAWINGS

Other objects and advantages of the present invention will become apparent from a study of the following specifications when considered with the accompanied drawings for preferred embodiments of the present invention in which.

DESCRIPTION OF THE PREFERRED EMBODIMENTS

Embodiment No. 1

Figure 1:
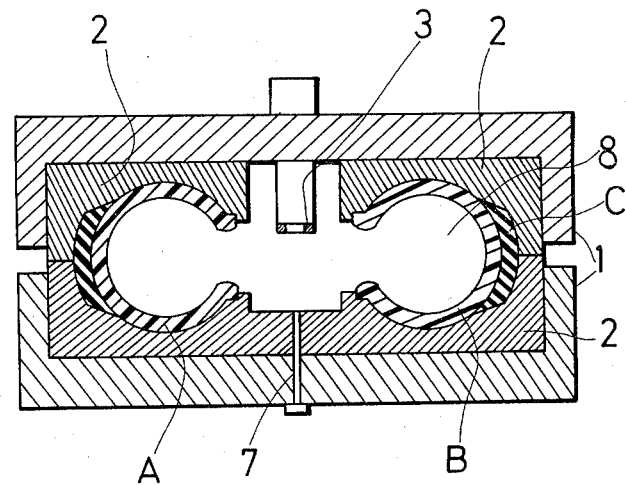
FIGS. 1 and 2 are longitudinal cross-sectional side views of a preferred embodiment with a full-sized tire curing matrix for moulding new tires or retreading used tires.
Figure 2:
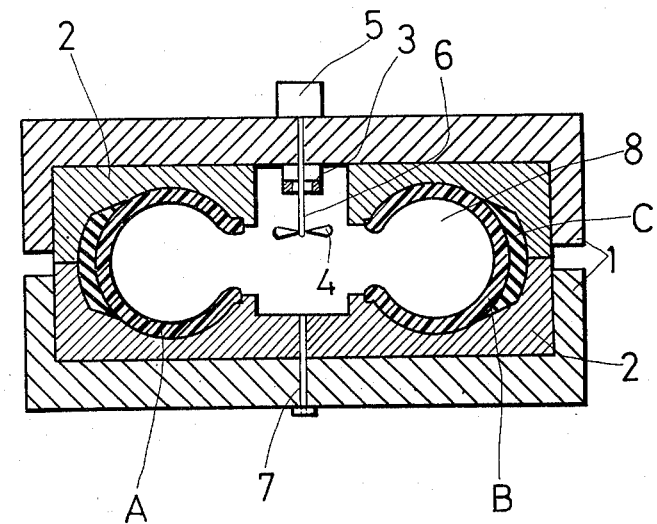

Referring now to FIGS. 1 and 2, the tire curing matrix assembly for new tires comprises a pair of matrix bases 1, fullsized tire receiving matrix segments 2 symmetrically split and secured to the respective matrix bases, a heater 3 mounted into the center area of one of the matrix segments 2, and a fan 4 installed adjacent to said heater 3 and connected by a spindle 6 to an outside motor 5.

The matrix assembly is further equipped with an air intake channel 7 which is connected to an outside source of pressurized air (not illustrated) and is open into the inner space formed in the closed matrix.

When a tire body A, having a tire casing B vulcanized or unvulcanized and an unvulcanized tread portion C capped onto the outer periphery of said casing B, is placed inside the symmetrically split tire receiving matrix segments 2 and hermetically sealed by the matrix segments 2 which are tightly closed, a hermetically sealed space 8 is thereby formed by the inside space of the tire casing B and the matrix.

Such a matrix without a fan as in FIG. 1 is suitable especially to vulcanize smaller tires, wherein interior vulcanization is directly performed by heating with a pressurized air introduced through the air intake channel 7 and with the radiation from the heater 3 located in the center of the closed space.

A matrix with a fan 4 as in FIG. 2 is preferable for larger tires or long-time vulcanization, wherein vulcanization is performed at a uniform temperature and the pressurized air is agitated with the fan 4 within the closed space 8.

Embodiment No. 2

In place of the full-sized tire receiving matrix segments 2 described in Embodiment 1 which receive the entire exterior of the tire body A to be cured, half-sized tire receiving matrix segments may be used to receive the tire tread portion and its adjacent side walls, if, in case of recapping tires for instance, the side walls of tire casing B are not found damaged.

Figure 3:
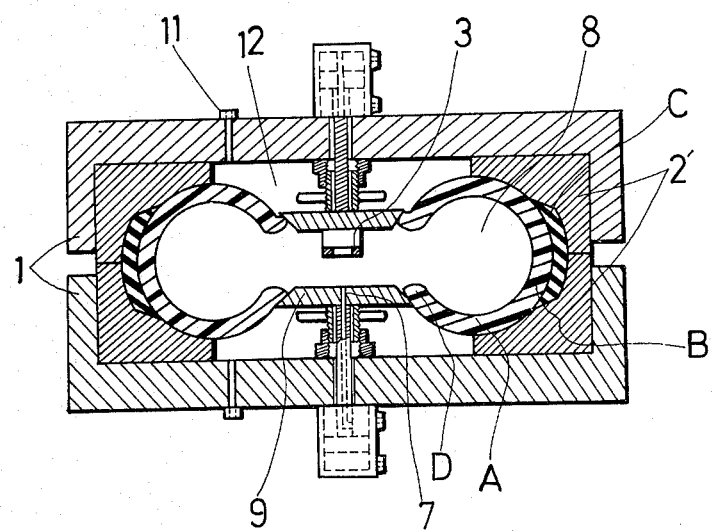
FIGS. 3 and 4 are longitudinal cross-sectional side views of a preferred embodiment with a half-sized tire curing matrix for retreading used tires.
Figure 4:
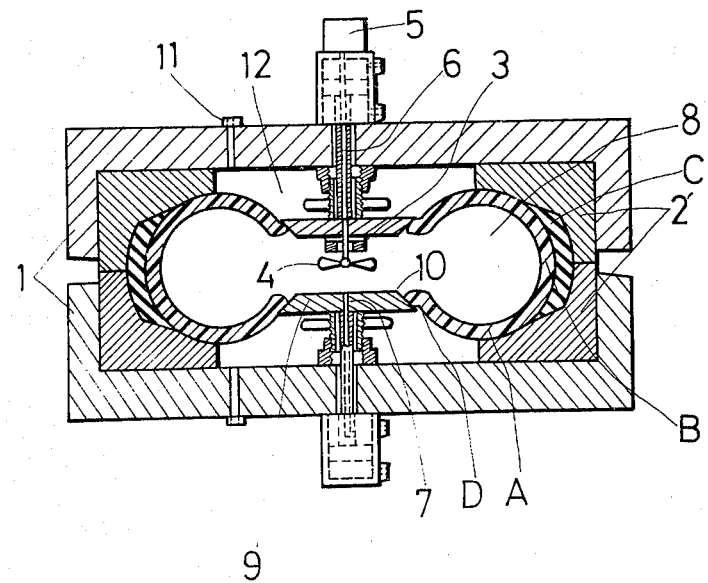

In FIGS. 3 and 4, said half-sized matrix assembly has symmetrically split half-sized tire receiving matrix segments 2 secured to a pair of matrix bases 1,. a pair of bead-holding plates are positioned at the central space of the matrix with at least one of the plates movably mounted and are hermetically pressed by their edges 10 against the tire beads D.

One of the bead-holding plates 9 carries a heater 3 on the top surface thereof, and also embraces a fan 4 connected with an outside motor 5 by a spindle 6 mounted through the center bore of said plate 9.

The other plate 9 is bored at the center and the stem thereof for an air intake channel 7, open in front of the other plate 9 and is connected to a pressurized air source (not illustrated).

Furthermore, the matrix base 1 has another air intake channel 11 bored thereon, opening into the central space inside the matrix base 1 and connected to a pressurized air source (not illustrated).

Now for the curing process, the tire body A to be cured is placed inside the matrix to be received by the matrix segments 2' secured on the matrix bases 1, and the matrix segments are hermetically closed. The bead holding plates 9 are pressed tight against the beads D of tire casing B, whereby hermetically sealed spaces 8 and 12 inside and outside the tire casing B respectively are formed.

It is the same manner as Embodiment No. 1 to vulcanize by filling said space 8 inside the tire casing B with pressurized air.

At this stage, the space 12 outside the tire casing B is supplied with pressurized air through the air intake channel 11 to maintain a predetermined degree of pressure difference between the spaces 8 and 12. For instance, by maintaining said pressure difference between the spaces 8 and 12 at the ordinary tire pressure required for road running, The curing may be effected under a condition similar to that for actually running on the road.

As above described, according to the present invention it is possible to apply heat to the inner side of tires to be cured with marked efficiency by hermetically confining said tire in the curing matrix, applying pressurized air directly against the inner side of the tire casing, and heating the tire by a radiation from the heat source and circulating said pressurized and heated air for curing purposes simultaneously, whereby the temperature of curing air is kept at a prescribed degree without dropping thus maintaining homogenity during the entire curing process.

Furthermore, it is possible to vary said curing temperature to any desirable levels during the curing process. Also correct pressure and temperature for curing may be easily chosen to suit various types of vehicular tires. This curing matrix system does not need any accessory vulcanizing devices such as bladders or expansion bags, and is easy to operate. The structure of the matrix assembly itself is also simple.

As is apparent from the above description of the features, the curing device in accordance with the present invention can contribute much to the industry for simplifying manufacturing process for various kinds of tires on a mass-production basis.

While the best form and embodiment of the invention has been illustrated and described, it will be apparent to those skilled in the art that modifications and changes may be made in the device described without deviating from the invention set forth in the following claims:

What is claimed is:

1. A method of vulcanizing a tire tread to a tire casing comprising:
   a. placing said casing with said tread provisionally adhered thereto into a space within a split tire receiving matrix assembly;
   b. closing said tire receiving matrix assembly and hermetically sealing the space within said assembly;
   c. hermetically sealing the space within said assembly which is formed by the inner wall of the tire casing from the remaining space within said assembly;
   d. injecting a pressurized fluid into the space formed by the inner wall of the tire;
   e. subsequently heating said pressurized fluid within said casing; and,
   f. simultaneously circulating said heated pressurized fluid within said casing thereby vulcanizing said tire tread to said tire casing and providing even heat distribution over the entire inner wall of said casing throughout the vulcanizing process.

2. The method of claim 1 further comprising controlling the pressure differential between the space formed by the inner wall and the space within said matrix assembly and outside of said casing.

* * * * *